US012322528B2

(12) United States Patent
Dalmia et al.

(10) Patent No.: US 12,322,528 B2
(45) Date of Patent: Jun. 3, 2025

(54) HYBRID CABLING SOLUTION FOR HIGHER BANDWIDTH AND MILLIMETER WAVE APPLICATIONS

(71) Applicant: Apple Inc., Cupertino, CA (US)

(72) Inventors: Sidharth S. Dalmia, San Jose, CA (US); Kiranjit Dhaliwal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/307,672

(22) Filed: Apr. 26, 2023

(65) Prior Publication Data

US 2023/0260674 A1 Aug. 17, 2023

Related U.S. Application Data

(62) Division of application No. 17/226,491, filed on Apr. 9, 2021, now Pat. No. 11,670,435.

(51) Int. Cl.

*H01B 7/08* (2006.01)
*H01B 7/04* (2006.01)
*H01B 9/00* (2006.01)
*H01B 11/18* (2006.01)

(52) U.S. Cl.

CPC ............... *H01B 7/04* (2013.01); *H01B 9/003* (2013.01); *H01B 11/18* (2013.01)

(58) Field of Classification Search

CPC .................................... H01B 7/08; H05K 1/02
See application file for complete search history.

(56) References Cited

U.S. PATENT DOCUMENTS

| | | | | |
|---|---|---|---|---|
| 5,003,273 | A | 3/1991 | Oppenberg | |
| 7,202,758 | B2 | 4/2007 | Hsu | |
| 9,930,770 | B2 | 3/2018 | Kim et al. | |
| 10,694,618 | B2 | 6/2020 | Coakley et al. | |
| 11,670,435 | B2 * | 6/2023 | Dalmia ................ | H01B 7/0823 174/102 R |
| 2011/0121922 | A1 | 5/2011 | Blair et al. | |
| 2012/0326813 | A1 | 12/2012 | Wong et al. | |
| 2013/0341072 | A1 | 12/2013 | Lin et al. | |
| 2014/0076607 | A1 | 3/2014 | Brock et al. | |

(Continued)

FOREIGN PATENT DOCUMENTS

KR 10-1280590 B1 7/2013

OTHER PUBLICATIONS

PCT/US2022/022584, "PCT Notification of Transmittal of the International Search Report and the Written Opinion of the International Searching Authority, or the Declaration", mailed Jul. 30, 2022, 11 pages.

*Primary Examiner* — Chau N Nguyen
(74) *Attorney, Agent, or Firm* — Aikin & Gallant, LLP

(57) ABSTRACT

Flexible cables may include multiple power, ground, and signal traces, and include EM interference suppression devices within the cable itself. Signal traces may be shielded by ground traces. The body of a cable may be divided into lateral portions through which different types of traces extend. One lateral side of a cable body may include a stack of power traces, while another lateral side of the cable body may include ground and signal traces. EBG patterns may be incorporated into ground traces. Capacitors may be positioned within the cable along its length, mounted between power and ground traces, for decoupling.

19 Claims, 8 Drawing Sheets

(56) References Cited

U.S. PATENT DOCUMENTS

| | | | | |
|---|---|---|---|---|
| 2016/0203887 | A1 | 7/2016 | Wiemeyer | |
| 2018/0052293 | A1 | 2/2018 | Mullaney et al. | |
| 2018/0068761 | A1 | 3/2018 | Chin | |
| 2018/0308639 | A1 | 10/2018 | Ikegaya | |
| 2021/0084756 | A1 | 3/2021 | Del Rosal et al. | |
| 2021/0273338 | A1 | 9/2021 | Wantiez | |
| 2022/0030701 | A1* | 1/2022 | Stollwerck ............... | G01R 1/18 |

* cited by examiner

HYBRID CABLING SOLUTION FOR HIGHER BANDWIDTH AND MILLIMETER WAVE APPLICATIONS

RELATED APPLICATIONS

This application is a divisional of co-pending U.S. application Ser. No. 17/226,491 filed Apr. 9, 2021, which is herein incorporated by reference.

BACKGROUND

Field

Embodiments described herein relate to cabling useful for the transmission of power and signals, and more particularly to such cabling used in electronic devices.

Background Information

In electronic devices that include radio wave transceivers, for example mobile phones, tablets, phablets, laptop computers, and numerous other devices, a carrier wave of a digital signal is often shifted from a first transmission frequency to an intermediate frequency (IF) for transmission within the device, before being again shifted to the transmission frequency from an antenna. Currently, board-to-board connections between IF transceivers that sit on a main board and an antenna, for example a side-firing millimeter wave antenna-in-package (AIP) array, are limited due to isolation, IR drop, voltage droop, and size with respect to area and cost.

Electromagnetic Band Gap (EBG) structures are structures that generate a stopband which greatly inhibits or completely blocks electromagnetic waves of predefined frequency bands. Some EBGs include a small, periodic pattern of small metal areas or patches on a dielectric substrate. EBG can refer to both the blocked frequency band as well as a device or medium itself which transmits electromagnetic waves that includes such a structure. EBG structures have been used with components of electronic devices to suppress electromagnetic noise. Because an EBG structure reflects only a small portion of electromagnetic waves of the frequency bands it can detect, the EBG shows high sensitivity in its receiving frequencies.

SUMMARY

Flexible cables are described in which power, signal, and ground traces may be laterally and vertically separated.

In an embodiment, a flexible cable includes a flexible body formed of an electrical insulation material and may include a top, a bottom vertically spaced from the top, and two sides extending vertically between the top and the bottom. The two sides may be laterally spaced apart, and the flexible body may include first and second longitudinally spaced apart ends. A plurality of conductive traces may extend longitudinally through the flexible body between the first and second ends. The plurality of conductive traces may include at least one power trace, at least one ground trace, and at least one signal trace, such that at least one signal trace is spaced laterally within the body from the at least one power trace.

In some embodiments, a flexible cable may include at least one interference suppression device within the flexible cable, which may be an embedded capacitor, an EBG grounding pattern formed in the at least one ground trace, a trench extending vertically between the top and the bottom, an LRC circuit formed in the at least one ground trace, or a lumped filter formed in the at least one ground trace.

In some embodiments, the at least one interference suppression device includes two interference suppression devices having different frequency suppression bands. The at least one interference suppression device may include at least one capacitor in electrical communication between the at least one power trace and the at least one ground trace. The at least one ground trace may be positioned vertically between the at least one capacitor and the at least one signal trace.

In some embodiments, the at least one interference suppression device may include at least one capacitor in electrical communication between the at least one power trace and the at least one ground trace. The at least one interference suppression device may include an EBG grounding pattern formed in the at least one ground trace. The at least one power trace may include a plurality of power traces stacked vertically within the body and laterally spaced from the at least one signal trace.

In some embodiments, a flexible cable may also include a plurality of vertically extending shunt traces interconnecting the plurality of power traces. A flexible cable may also include a plurality of vertically extending shunt traces interconnecting the plurality of ground traces. The at least one power trace may be laterally spaced from the at least one ground trace and from the at least one signal trace. The at least one signal trace may be vertically spaced from the at least one ground trace. The at least one ground trace may include two ground traces, and the at least one signal trace may be positioned vertically between the two ground traces.

In some embodiments, the at least one ground trace may include first, second, and third ground traces, and the at least one signal trace may include first and second signal traces, with the first signal trace being positioned vertically between the first and second ground traces, and the second signal trace being positioned vertically between the second and third ground traces. The at least one signal trace may also include third and fourth signal traces, with the third signal trace being positioned vertically between the first and second ground traces and laterally adjacent to the first signal trace, and the fourth signal trace being positioned vertically between the second and third ground traces and laterally adjacent to the second signal trace. A flexible cable may also include an interference suppression trench extending vertically between the top and the bottom laterally adjacent to the at least one signal trace.

In some embodiments, the at least one ground trace may include two ground traces and the at least one power trace may be positioned vertically between the two ground traces.

In some embodiments, a flexible cable may also include a junction block between the first and second ends, the at least one signal trace may include first and second signal traces, the body splits into first and second arms at said junction block, the first signal trace extends from the junction block only through the first arm, and the second signal trace extends from the junction block only through the second arm. The junction block may also include at least one switch, at least one interference suppressor, signal enhancement circuitry, or combinations thereof.

In an embodiment, a system may include a first radio frequency transceiver, a second radio frequency transceiver, and a power source. A cable may include a flexible body formed of an electrical insulation material, the flexible body including a top, a bottom vertically spaced from the top, and two sides extending vertically between the top and the bottom, with the two sides being laterally spaced apart. The flexible body may include first and second longitudinally spaced apart ends. A plurality of conductive traces may extend longitudinally through the flexible body between the first and second ends. The plurality of conductive traces may include at least one power trace, at least one ground trace, and at least one signal trace, such that at least one signal trace is spaced laterally within the body from the at least one power trace. The at least one power trace may be connected to the power source and the at least one signal trace may be connected to both of the first and second radio frequency transmitters to communicate a signal therebetween.

DETAILED DESCRIPTION

Described herein are exemplary embodiments of flex cables. In various embodiments, description is made with reference to figures. However, certain embodiments may be practiced without one or more of these specific details, or in combination with other known methods and configurations. In the following description, numerous specific details are set forth, such as specific configurations, dimensions, and processes, etc., in order to provide a thorough understanding of the embodiments. In other instances, well-known manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The terms "above", "over", "to", "between", "in", and "on" as used herein may refer to a relative position of one element with respect to other elements. One element "above" or "over" another element may be directly in contact with the other element or may have one or more intervening elements. One element "between" other elements may be directly in contact with the elements or may have one or more intervening elements.

In one aspect, embodiments may include constructions of flexible cables, which may be intermediate frequency cables, which may include power traces, interference suppression or cancellation filters, and/or repeated placement of capacitors, in space constrained applications. Laterally separating power traces from signal traces within the body of a flexible cable may also improve signal transmission fidelity.

Figure 1:
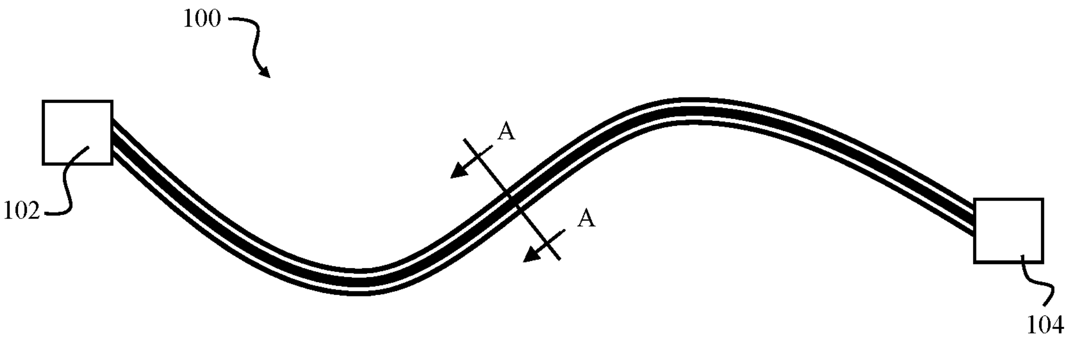
FIG. 1 illustrates a highly simplified plan view of a flexible cable.

Referring now to FIG. 1, a highly simplified top plan view of a flex cable 100 is illustrated. Cable 100 may be connected between two or more electronic components 102, 104, which may be, but are not limited to, radio frequency transceivers, e.g., IF transceivers operating within 9-15 Ghz, which may be or include frequency down converters, and the like, and other electronic components as described elsewhere herein which are connected to any other electrical component by an electrical conductor in order to perform its function. Such radio frequency transceivers are well known, commonly commercially available, and are incorporated into many electronic devices, including mobile phones. Components 102, 104 may also include voltage sources, e.g., VDD, connections to electrical ground, antennae, and the like. The components 102, 104 are located at opposite longitudinal ends of the flex cable 100. Elements (e.g., components 102, 104) connected to the ends of flex cable 100 and other flex cables as described herein, may include electronic modules, multi-layer boards (MLBs), systems-in-package (SiPs), antenna modules, or other hardware with circuitry configured to transmit and/or receive signals over flex cables.

Figure 2:
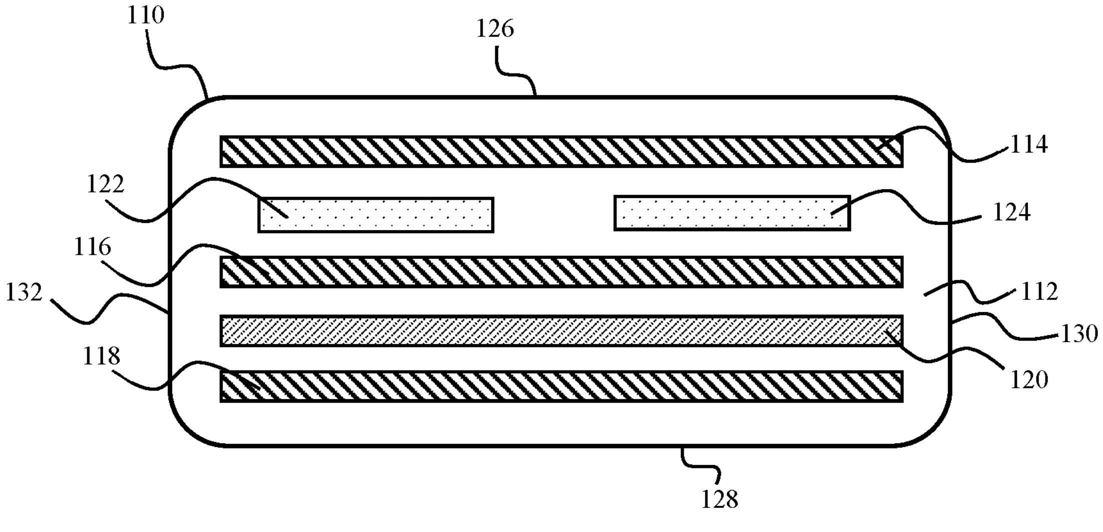
FIG. 2 illustrates a cross sectional view taken at line A-A in FIG. 1.

FIG. 2 illustrates a cross sectional view of a flex cable, such as flex cable 100, taken at line A-A in FIG. 1. The flex cable 100 includes a body 112 formed of an electrically insulating material, e.g., a dielectric material, which is flexible enough to bend back on itself without breaking or rupturing. An optional casing 110 may be provided on the outer surface of the body 112. The body 112 includes a top 126, a bottom 128, and sides 130, 132 extending between the top and the bottom. In embodiments, the cross-section of the body 112 may be rectangular, i.e., the top and bottom are longer than each of the sides. For the sake of clarity, the illustrations herein may exaggerate the vertical thickness of the body 112. As used herein, the word "vertical" (or its equivalent) means the direction directly between the top and bottom, and the word "lateral" (or its equivalent) means the direction directly between the two sides, perpendicular to "vertical." The designations top, bottom, and side(s) may be arbitrary, as a flex cable may be rotated in space without changing its structure, and therefore these terms are used merely to assist in describing the cables described herein.

Encased within the material of the body 112 are a plurality of electrical conductors which extend longitudinally along the flex cable 100 between its two opposite ends at components 102, 104. The conductors may take any of numerous forms, including but not limited to electrically conductive wires, electrically conductive ink, differential lines, transmission lines, or wide buses, any of which are generally referred to herein as a "trace". The plurality of traces may include one or more power traces, ground traces, and signal carrying traces, as well as other traces performing different functions. In some embodiments a respective trace is electrically and/or physically continuously connected between component 102 and component 104. In some embodiments a respective trace is electrically and/or physically continuously connected between component 102 and component 104, through an intermediate structure embedded in flex cable 100, such as a repeater. In some embodiments a respective trace is not electrically and/or physically continuously connected between component 102 and component 104. For example, such a structure may be embedded within casing 110 for shielding purposes and/or to provide mechanical support. The plurality of traces may include ground traces 114, 116, 118, which extend laterally (left and right in FIG. 2) through the body 112 nearly completely between the sides 130, 132, leaving a small portion of the body laterally enveloping the traces so that they are electrically insulated. The plurality of traces may further include a power trace 120, e.g., a VDD, a base supply voltage for microelectronics. Power trace 120 may be vertically positioned ("sandwiched") between two of the ground traces, e.g., ground traces 116 and 118, which isolates the power being transmitted through the flex cable. The plurality of traces may further include one or more signal traces, e.g., intermediate frequency signal traces 122, 124, which may be vertically sandwiched between ground traces 114, 116 and laterally spaced from each other in laterally left and right portions of the cross-section of the body 112. In this manner, the power trace 120 is isolated from the signal traces 122, 124 by the interposition of a ground trace 116. Such a configuration may, however, experience noisy signals transmitted along the signal traces because there is no provision for noise cancellation or filtering along the cable itself, and has limited power transmission capacity because of the inclusion of only a single power trace. In some embodiments, cables described herein may be a flexible flat cable (FFC), a ribbon cable, a flexible printed circuit (FPC), a coaxial cable, or any other type of cable. Furthermore, flexible materials may be used to form cables described herein, such as liquid crystal polymer (LCP) and polyimide and may be mixed or otherwise combined with very high permittivity materials so that the resulting composite material may act as distributed capacitance along the length of a flex cable, which may also reduce EM interference. By way of example and not of limitation, alumina, ceramic powders, nano composites, and the like may be used to produce a high permittivity flex cable, which may benefit noise reduction on power traces and may reduce voltage droop. Additionally, the use of such a composite material may also make EBGs more effective.

Figure 3:
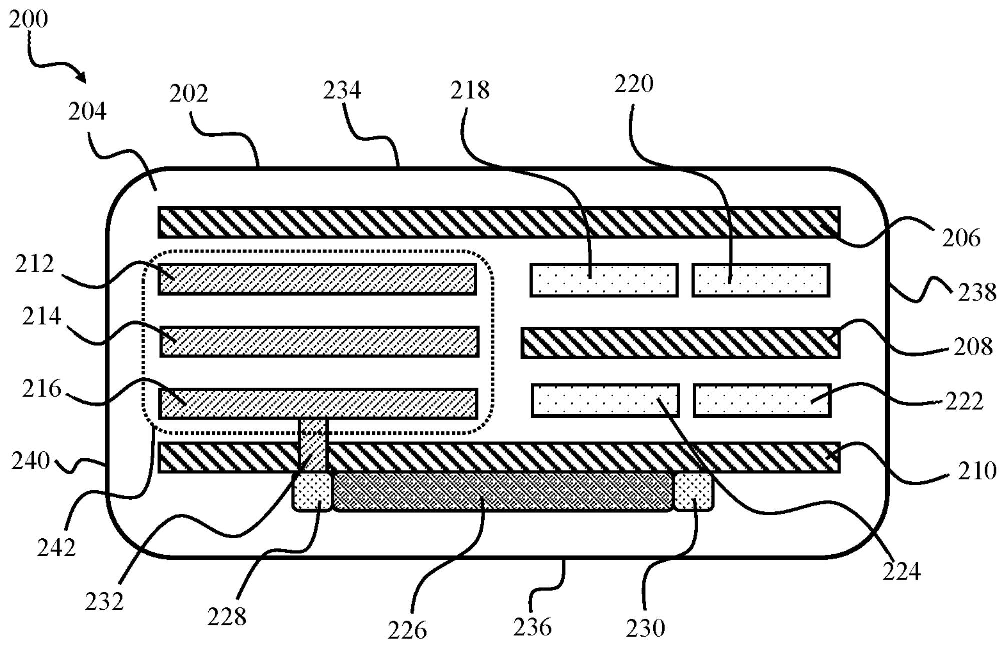
FIG. 3 illustrates a cross sectional view, similar to that taken at line A-A in FIG. 1, of a first embodiment of a cable.

FIG. 3 illustrates a cross sectional view, similar to that taken at line A-A in FIG. 1, of a first embodiment of a flex cable 200. Cable 200 includes a body 204 formed of an electrically insulating material, e.g., a dielectric, which may optionally be enveloped in an outer casing 202. The body 204 includes a top 234, a bottom 236, and two sides 238, 240 extending between the top and the bottom. Cable 200 may include an upper ground trace 206 adjacent the top 234, a lower ground trace 210 adjacent to the bottom 236, and a middle ground trace 208 positioned vertically between the upper and lower ground traces and may form gaps between it and each of the upper and lower ground traces. Ground traces 206, 210 may extend laterally through the body 204 nearly completely between the sides 238, 240, leaving a small portion of the body laterally enveloping the ground traces so that they are electrically insulated. Middle ground trace 208 is laterally shorter than one or both of the upper ground trace 206 and the lower ground trace 210 and is laterally positioned on one lateral portion (here, the right portion in FIG. 3) within the body 204, its end adjacent to the side 238 insulated by a small portion of the body.

A number of signal traces may longitudinally extend through the body 204. By way of example, signal traces 218, 220 may be located between the upper ground trace 206 and the middle ground trace 208, in the gap formed therebetween, and may be generally vertically aligned with the middle ground trace. Signal traces 222, 224 may be located between the lower ground trace 210 and the middle ground trace 208, in the gap formed therebetween, and may also be generally vertically aligned with the middle ground trace. In this way, one lateral portion of the body houses the signal traces 218-224, vertically sandwiched between ground traces to provide shielding and mechanical stability. Each of the signal traces 218-224 may be attached to the same or different signal sources, e.g., a first intermediate frequency generator, a second intermediate frequency generator, an intermediate frequency clock, or one or more control signals.

The cable 200 may include a number of power traces longitudinally extending through the body 204. In some embodiments, power traces 212, 214, 216 are vertically spaced apart from each other, are stacked and vertically sandwiched between upper ground trace 206 and lower ground trace 210 without contacting either ground trace and are located laterally next to the signal traces 218-224 and the middle ground trace 208 on one lateral portion of the body 204. In some embodiments, the power traces may be grouped together as a set 242 of a plurality of power traces, indicated throughout by broken line, which permits power traces to be arranged without a signal trace or ground trace between any of the power traces. In some embodiments, the plurality of power traces in a set 242 may carry more than one voltage through the cable because of the provision of more than one conductor. Additionally, a set of a plurality of power traces may be laterally sized and positioned so as to not span the entire width of the cable, which may leave lateral space for signal and/or ground traces laterally adjacent to one ore a plurality of power traces in a set of power traces. The power traces 212-216 may be connected to the same voltage source. In some embodiments, each respective power trace (e.g., of power traces 212-216) in flex cable 200 may be connected to one of a plurality of voltage sources. The laterally middle ends of each of the power traces 212-216 are spaced and electrically insulated from the signal traces 218-224 and the middle ground trace 208. One of ordinary skill in the art will appreciate that the number of signal traces, power traces, and ground traces in flex cable 200 may vary from those depicted in FIG. 3. In some embodiments, power traces, including but not limited to power traces 212-216, may be directly laterally adjacent to signal traces, e.g., including but not limited to signal traces 218-224.

One or more interference suppression devices may be included in the body 204 to suppress EM interference and coupling from the power traces. In some embodiments, the interference suppression devices may be one or more capacitors 226 positioned within the body 204. In the embodiment of FIG. 3, capacitor(s) 226 are positioned between the lower ground trace 210 and the bottom 236 of the body 204. A first terminal connector 228 for each capacitor electrically connects the capacitor 226 to power trace 216 through an insulated via 232 or the like which passes through the lower ground trace 210, while a second terminal connector 230 for each capacitor electrically connects the capacitor to the lower ground trace. As well understood by those of ordinary skill in the art, embedded passive elements in flex cable 200, such as capacitor(s) 226, may decouple the power from the signals transmitted through the signal traces. Capacitor(s) 226 may be multilayer ceramic chip capacitors, e.g., 0402 and/or 0201 capacitors, liquid crystal polymer capacitors, or the like, and may be shielded.

Figure 4:
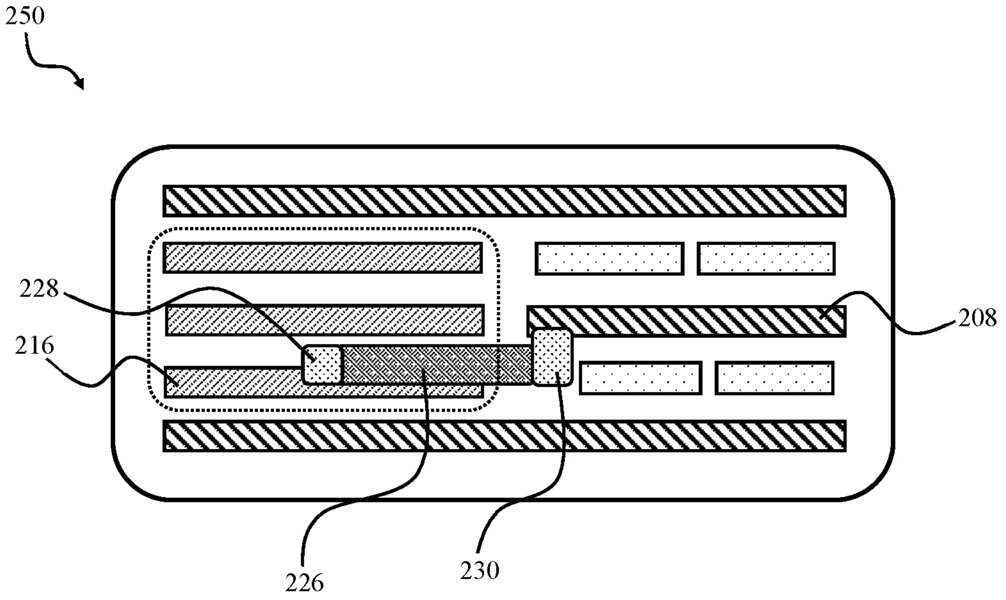
FIG. 4 illustrates a cross sectional view, similar to that taken at line A-A in FIG. 1, of a second embodiment of a cable.

FIG. 4 illustrates a cross sectional view, similar to that taken at line A-A in FIG. 1, of a second embodiment of a flex cable 250. Flex cable 250 is very similar to flex cable 200, and therefore only their differences will be described. In some embodiments, passive elements such as capacitor(s) 226, are embedded with the power traces so that the via 232 can be eliminated. Capacitor(s) 226 are positioned to overlap part of one of the power traces and part of one of the ground traces so that terminal connector 228 is in contact with the power trace 216 and terminal connector 230 is in contact with middle ground trace 208.

Figure 5:
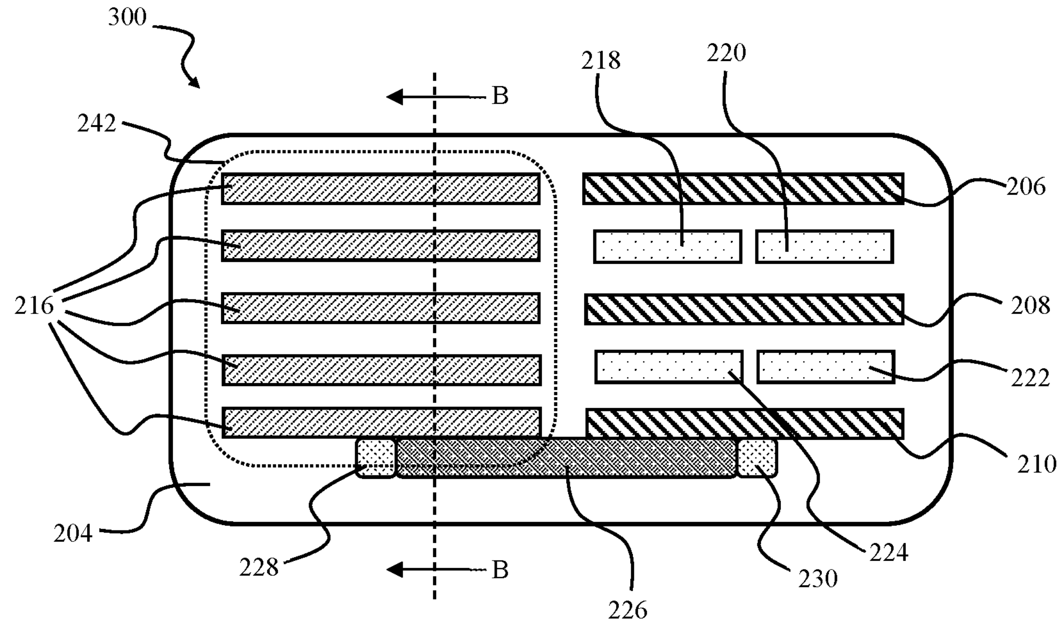
FIG. 5 illustrates a cross sectional view, similar to that taken at line A-A in FIG. 1, of a third embodiment of a cable.

FIG. 5 illustrates a cross sectional view, similar to that taken at line A-A in FIG. 1, of a third embodiment of a flex cable 300. As with other embodiments described herein, cable 300 includes ground traces 206, 208, 210 and signal traces 218-224 segregated to one lateral portion (in FIG. 5, the right portion) of the cable body. Ground traces 206 and 210 are laterally the same length as ground trace 208, so that one lateral portion of the interior of the cable body includes a vertical, alternating stack of ground traces and signal traces. The laterally opposite portion of the cable body includes a vertical stack of spaced apart power traces 216. In some embodiments, all of power traces 216 may be connected to the same voltage source, and in some embodiments each respective power trace 216 is connected to one of a plurality of voltage sources. One of ordinary skill in the art will recognize that while five traces are illustrated, the cable 300 may include more or fewer. Capacitor(s) 226 are positioned generally laterally centered, vertically between the lower ground trace 210 and the bottom 236 of the body 204, and vertically between the lowermost power ground trace 216 and the bottom of the body. A first terminal connector 228 for each capacitor electrically connects the capacitor 226 to the lowermost power trace 216, while a second terminal connector 230 for each capacitor electrically connects the capacitor to the lower ground trace 210. In some embodiments, power traces, including but not limited to power traces 216, may be directly laterally adjacent to signal traces, e.g., including but not limited to signal traces 218-224.

Figure 6:
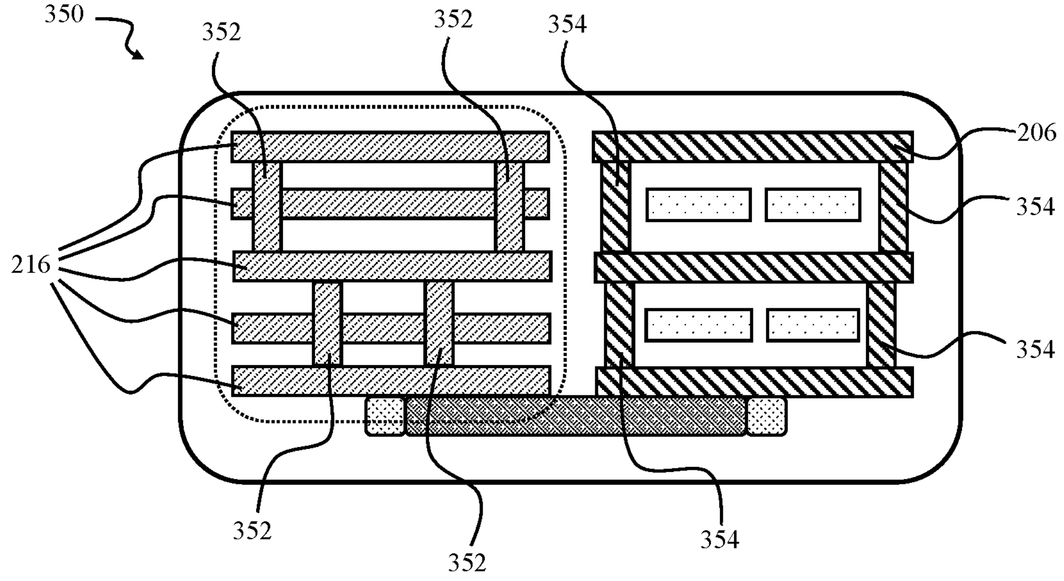
FIG. 6 illustrates a cross sectional view, similar to that taken at line A-A in FIG. 1, of a fourth embodiment of a cable.

FIG. 6 illustrates a cross sectional view, similar to that taken at line A-A in FIG. 1, of a fourth embodiment of a flex cable 350. Flex cable 350 is very similar to flex cable 300, and therefore only their differences will be described. Cable 350 includes one or more interconnecting shunt traces 352, 354 which electrically interconnect the several power traces 216 and the ground traces 206-210, respectively. Shunt traces 352, 354 extend vertically between and/or through individual traces and may have a longitudinal length (in and out of the plane of FIG. 6) about the same as their lateral width. The longitudinal length of the shunt traces 352, 354 may stiffen the cable 350 against flexing up-and-down (i.e., with a neutral plane extending laterally and out of the plane of FIG. 6). In some embodiments, shunt traces may be implemented in portions of flex cable 350, and therefore can be selected to stiffen some longitudinal sections of the cable 350, while leaving other longitudinal sections with essentially the same flexibility as cable 300 of FIG. 5.

Figure 7:
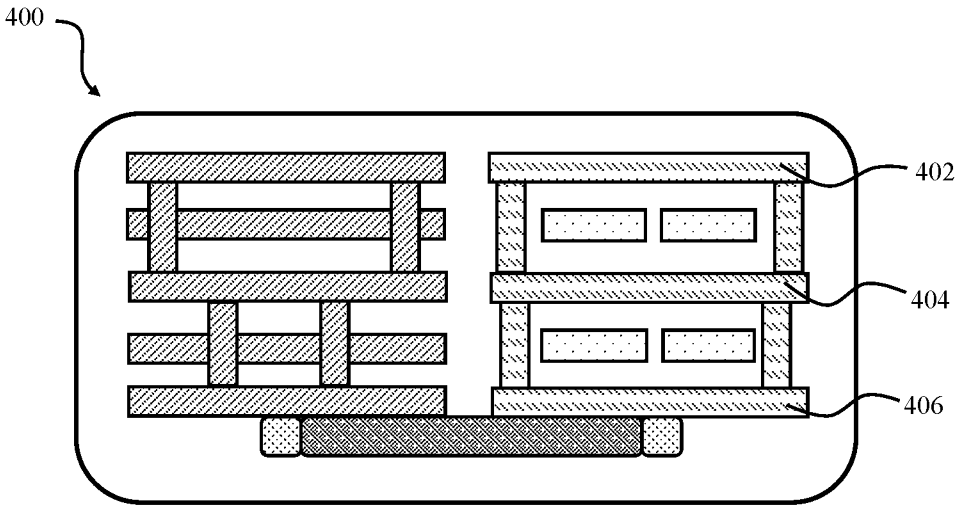
FIG. 7 illustrates a cross sectional view, similar to that taken at line A-A in FIG. 1, of a fifth embodiment of a cable.

FIG. 7 illustrates a cross sectional view, similar to that taken at line A-A in FIG. 1, of a fifth embodiment of a flex cable 400. As with the description of FIG. 6, flex cable 400 is very similar to flex cables 300, 350 and therefore only their differences will be described. Cable 400 includes ground traces 402, 404, 406 in the place of ground traces 206, 208, 210. Ground traces 402, 404, 406 may each include one or more EM interference suppression devices. The one or more EM interference suppression devices may be any known devices that may be physically incorporated into the flex cable 400, including, but not limited to, an EBG grounding pattern formed in, and/or serially in line with, one or more of the ground traces 402, 404, 406, and/or an LRC circuit formed in, and/or serially in line with, one or more of the ground traces, and/or lumped filters formed in, and/or serially in line with, one or more of the power and/or ground traces. When more than one EM interference suppression devices are incorporated into one or more of the ground traces, they may be designed or tuned to suppress EM interference in the same frequency band, overlapping frequency bands, or non-overlapping frequency bands, depending on the nature of the EM interference to which cable 400 is exposed. In this manner, EM interference in noisy environments in which the cable 400 is to be used can be selectively attenuated from interfering with the signals carried on the one or more signal traces 218-224.

Figure 8:
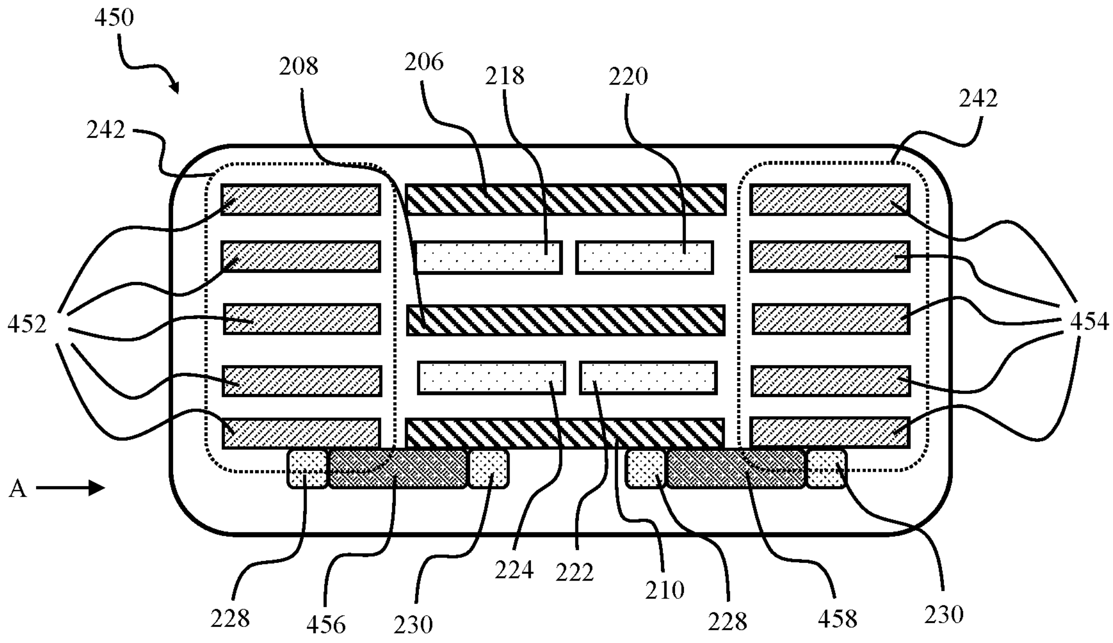
FIG. 8 illustrates a cross sectional view, similar to that taken at line A-A in FIG. 1, of a sixth embodiment of a cable.

FIG. 8 illustrates a cross sectional view, similar to that taken at line A-A in FIG. 1, of a sixth embodiment of a flex cable 450. Flex cable 450 has a basic arrangement or configuration of its traces that differs in some respects from those of other embodiments described herein but retains some similarities as well. In one sense, cable 450 may be thought of as cable 300 (FIG. 5) with the ground and signal traces laterally moved from a first lateral portion (e.g., the right lateral portion, as viewed in FIG. 8) of the cable 300 to a center portion of cable 450, the power traces reduced in lateral length, and a second set of power traces added to the first lateral portion (e.g., the right lateral portion) of the cable 450. Thus, cable 450 may include a first set of power traces 452 positioned laterally in a second lateral portion (e.g., left lateral portion, as viewed in FIG. 8) of the cable. When more than one trace 452 is provided, they may be stacked vertically, as described elsewhere herein. Cable 450 may include a second set of power traces 454 positioned laterally in a right lateral portion of the cable; and, when more than one trace 454 is provided, they likewise may be stacked vertically, as described elsewhere herein. A laterally center portion of the cable 450 may include ground traces 206, 208, 210, and signal traces 218-224, as described elsewhere herein. Power traces 452, 454 may be connected to the same or to different voltage sources, and the same or different electronic components 102, 104. When connected to different voltage sources, power traces 452, 454 may be connected to different electronic components which have different power requirements. Cable 450 may also include one or more capacitors 456, 458, which may be substantially similar to capacitors described elsewhere herein. Capacitors 456, 458 may include first and second terminal connector 228, 230, as described elsewhere herein, and are positioned to electrically connect each set of power traces 452, 454 to a ground trace, e.g., ground trace 210. In the illustrated embodiment, capacitors 456, 458 span the left and center, and right and center, lateral portions of the cable. FIG. 8 also includes directional arrow A, to which reference will be made elsewhere herein. In some embodiments, power traces, including but not limited to power traces 452, 454, may be directly laterally adjacent to signal traces, e.g., including but not limited to signal traces 218-224.

Figure 9:
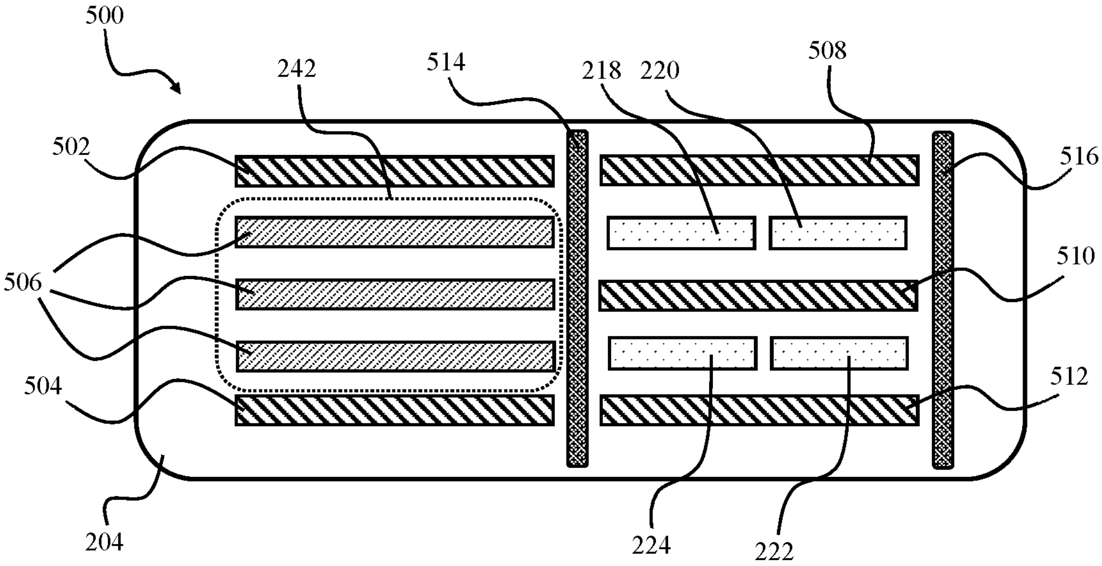
FIG. 9 illustrates a cross sectional view, similar to that taken at line A-A in FIG. 1, of a seventh embodiment of a cable.

FIG. 9 illustrates a cross sectional view, similar to that taken at line A-A in FIG. 1, of a seventh embodiment of a flex cable 550. Cable 500 may include a plurality of ground traces 502, 504, 508, 510, and 512, one or more power traces 506, signal traces 218-224 as described elsewhere herein, and shielding trenches 514, 516. In a first lateral portion (here the left lateral portion) of the body 204 of the cable 500, a vertical sandwich or stack is formed of ground trace 502 vertically adjacent to the top of the body 204, ground trace 504 vertically adjacent to the bottom of the body, and one or more power traces 506 vertically stacked between the ground traces 502, 504. In a second lateral portion (here the right lateral portion) of the body 204 of the cable 500, ground traces 508, 510, 512, and signal traces 218-224 may be arranged in a vertical double-decker sandwich configuration as described elsewhere herein, e.g., with respect to FIG. 5. In some embodiments, a first vertically and longitudinally extending trench 514 may be positioned between the right-side lateral ends of the traces 502-506 and the left side lateral ends of traces 218-224 and 508-512; that is, trench 514 may be positioned approximately in the lateral middle of the body 204. In some embodiments, a trench, such as trench 514, is positioned within cable 500 equidistantly between a set of power traces (e.g., power traces 506) and a set of signal traces (e.g., signal traces 218-224). In some embodiments, second vertically and longitudinally extending trench 516 may be positioned on the far-right lateral portion of the body 204, to the right of the right side ends of traces 218-224 and 508-512. In some embodiments, a trench may be positioned between signal traces of a set of signal traces, to mitigate cross-talk between signal traces. Trenches 514, 516 are provided to shield the signal traces 218-224, the ground traces 508-512, or both from EM interference which may originate from power traces 506 and from sources external to the body 204. Trenches 514, 516 may be formed of any material(s) suitable for this purpose, including, but not limited to, copper and the like. In this manner, signal traces 218-224 are shielded vertically by ground traces, and laterally by one or more trenches 514, 516. In some embodiments, one or more trenches, such as trenches 514, 516 may continuously extend the entire longitudinal length of cable 500, and in some embodiments the one or more trenches may extend discontinuously for some or all of the entire longitudinal length of cable 500. In some embodiments, one trench (e.g., trench 514) may extend continuously for the entire longitudinal length of cable 500, while another trench (e.g., trench 516) does not extend continuously for the entire longitudinal length of cable 500. In some embodiments, power traces, including but not limited to power traces 506, may be directly laterally adjacent to signal traces, e.g., including but not limited to signal traces 218-224, separated by trench 514.

Figure 10:
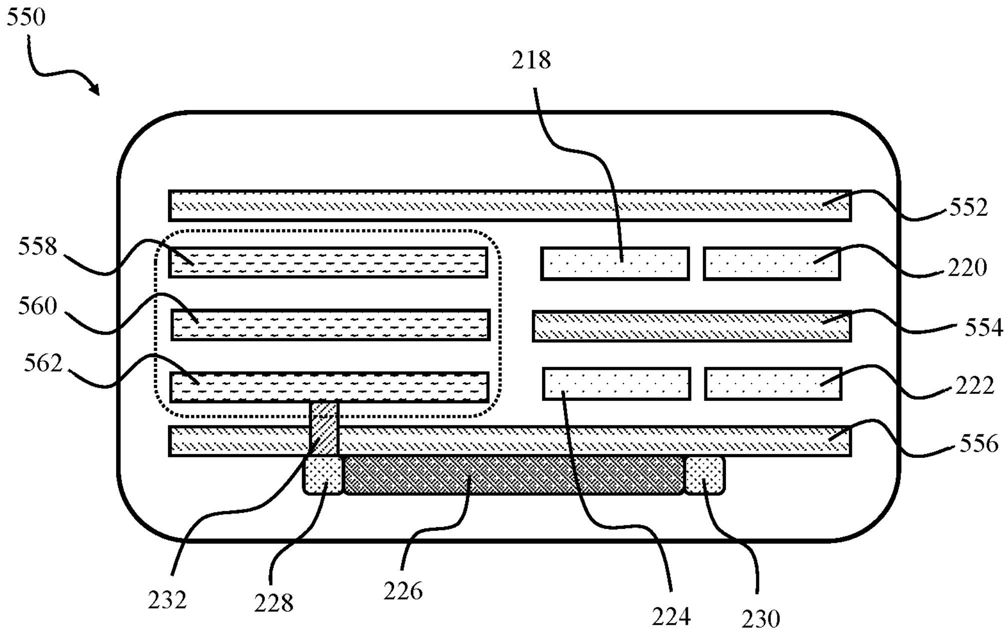
FIG. 10 illustrates a cross sectional view, similar to that taken at line A-A in FIG. 1, of an eighth embodiment of a cable.

FIG. 10 illustrates a cross sectional view, similar to that taken at line A-A in FIG. 1, of an eighth embodiment of a flex cable 550. Cable 550 is similar in many respects to cable 200 described with respect to FIG. 3. Cable 550 embodies and is an example of the further inclusion of EM interference suppression devices into one or more of any power and/or ground trace in any flex cable, including, but not limited to, those described expressly herein. As with the cable 200, cable 550 may include signal traces 218-224, arranged as described with reference to FIG. 3. Cable 550 also may include power and ground traces as arranged in cable 200; however, one or more of the power and/or ground traces exemplified in cable 550 may include one or more EM interference suppression devices. Thus, one or more of power traces 558, 560, 562 may include one or more EM interference suppression devices, and one or more of ground traces 552, 554, 556 may include one or more EM interference suppression devices. The one or more EM interference suppression devices may be any known devices that may be physically incorporated into the flex cable 550, including, but not limited to, an EBG grounding pattern formed in, and/or serially in line with, one or more of the power and/or ground traces, and/or an LRC circuit formed in, and/or serially in line with, one or more of the power and/or ground traces, and/or lumped filters formed in, and/or serially in line with, one or more of the power and/or ground traces. When more than one EM interference suppression devices are incorporated into one or more of the power and/or ground traces, they may be designed or tuned to suppress EM interference in the same frequency band, overlapping frequency bands, or non-overlapping frequency bands, depending on the nature of the EM interference to which the cable is exposed, which may be any flex cable described herein. In this manner, EM interference in noisy environments in which the cable is to be used can be selectively attenuated from interfering with the signals carried on the one or more signal traces 218-224. In some embodiments, power traces, including but not limited to power traces 558-562, may be directly laterally adjacent to signal traces, e.g., including but not limited to signal traces 218-224. In some embodiments, each power trace may have a dedicated EM interference suppression device, e.g., a capacitor between each power trace and a ground trace.

Figure 11:
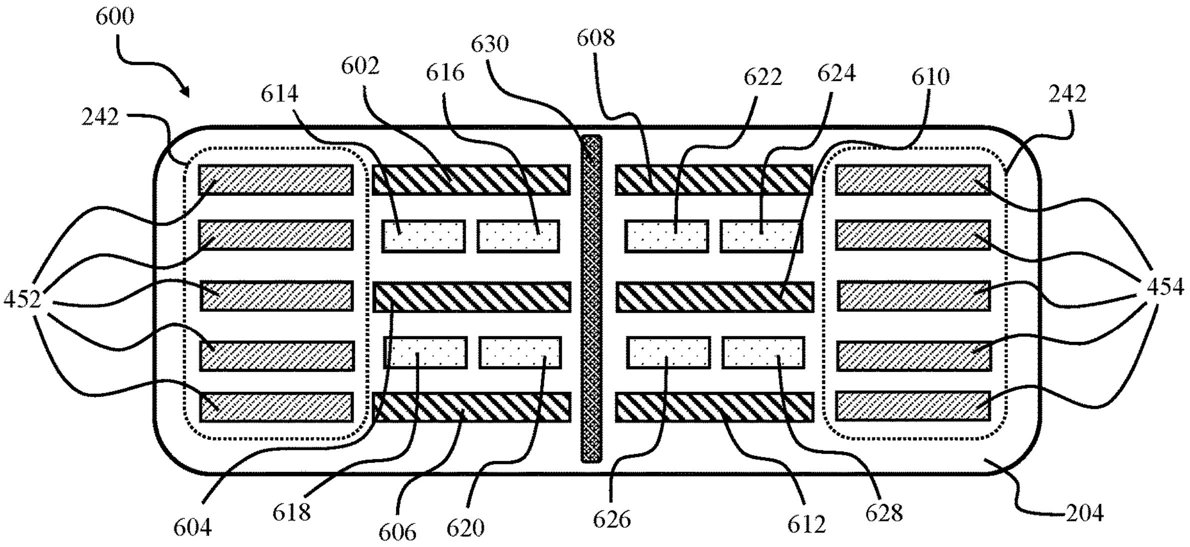
FIG. 11 illustrates a cross sectional view, similar to that taken at line A-A in FIG. 1, of a nineth embodiment of a cable.

FIG. 11 illustrates a cross sectional view, similar to that taken at line A-A in FIG. 1, of a ninth embodiment of a flex cable 600. In general terms, cable 600 may have a left-right laterally symmetric arrangement of power, ground, and signal traces, with a trench positioned in a middle portion of the body of the cable to shield the traces of each side from the traces of the other side. Stated somewhat differently, the left and right lateral portions of cable 600 may be mirror images of each other. Cable 600 may include one or more first power traces 452 positioned laterally in first portion (here a left lateral portion) of the body 204; when more than one power trace 452 is provided, they may be vertically arranged in a stack, and may be connected to the same or different voltage sources. Cable 600 may include one or more second power traces 454 positioned laterally in second portion (here a right portion) of the body 204; when more than one power trace 454 is provided, they may be vertically arranged in a stack, and may be connected to the same or different voltage sources. In embodiments, power traces 452 are connected to different voltage sources and different components 104 from power traces 454. By way of a non-limiting example, power traces 452 may be connected to VDD main, and power traces 454 may be connected to VDD aux.

Cable 600 may include one or more ground traces 602, 604, 606, vertically stacked to one lateral side (here the right side) of the power traces 452, and one or more ground traces 608, 610, 612, vertically stacked to the other lateral side (the left side) of the power traces 454. One or more signal traces 614, 616, 618, 620 may be positioned between ground traces 602, 604, 606, for example, with signal traces 614, 616 positioned laterally adjacent to each other and vertically sandwiched between ground traces 602, 604, and signal traces 618, 620 positioned laterally adjacent to each other and vertically sandwiched between ground traces 604, 606. Likewise, one or more signal traces 622, 624, 626, 628 may be positioned between ground traces 608, 610, 612, for example, with signal traces 622, 624 positioned laterally adjacent to each other and vertically sandwiched between ground traces 608, 610, signal traces 626, 628 positioned laterally adjacent to each other and vertically sandwiched between ground traces 610, 612. Each of the signal traces 614-628 may carry the same or a different signal from the other signal traces. One or more trench(es) 630 may be positioned between the right (middle) ends of ground traces 602, 604, 606 and the left (middle) ends of ground traces 608, 610, 612. Trench 630 may be substantially the same in construction as trenches 514, 516 as discussed elsewhere herein. In embodiments, the power and signal traces from one lateral portion (here the right lateral portion) of cable 600 lead to and from a first set of transceivers, and the power and signal traces from the other lateral portion (here the left lateral portion) of cable 600 lead to and from a second set of transceivers, different from the first set of transceivers. Cable 600 may be useful when left-right symmetry may be useful, e.g., in virtual or augmented reality headsets to segregate the left and right image data signals. In some embodiments, power traces, including but not limited to power traces 452, 454, may be directly laterally adjacent to signal traces, e.g., including but not limited to signal traces 614-628, separated by trench 630.

Figure 12:
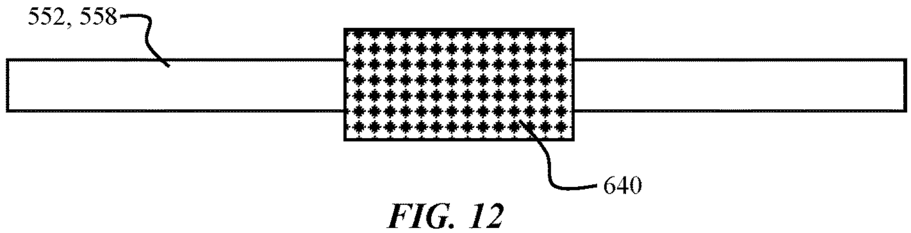
FIG. 12 illustrates a highly simplified plan view of a ground trace.

FIG. 12 illustrates a highly simplified plan view of a power trace 558 or ground trace 552, as seen in the direction of arrow A in FIG. 8, which includes one or more EM interference suppression devices 640, such as any of those described elsewhere herein, positioned along the longitudinal length of the trace.

The EM interference suppression devices 640 may include an EBG pattern formed in, and/or serially in line with, one or more of the power and ground traces 558, 552, and/or an LRC circuit formed in, and/or serially in line with, one or more of the power and ground traces, and/or lumped filters formed in, and/or serially in line with, one or more of the power and/or ground traces. Forming such EM interference suppression devices in the trace itself, or serially along the trace, may greatly decrease the volume needed to provide the EM interference suppression devices and may benefit from being formed when the traces are formed within the body 204.

Figure 13:
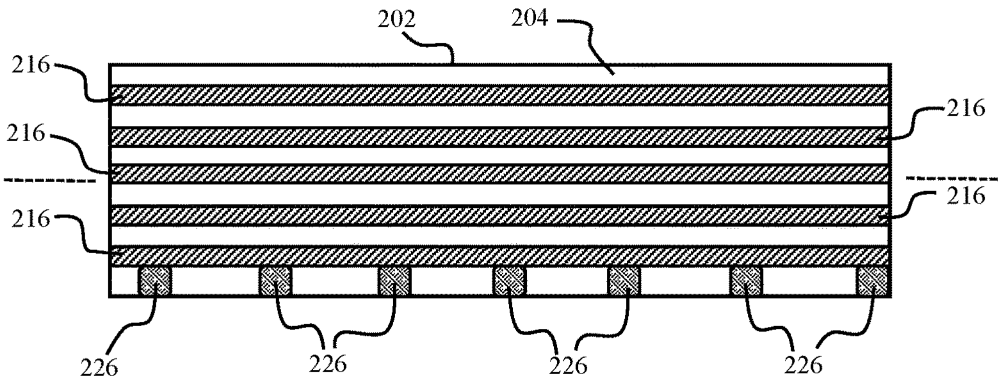
FIG. 13 illustrates a cross-sectional view taken at line B-B in FIG. 5.

FIG. 13 illustrates a cross-sectional view taken at line B-B in FIG. 5 and illustrates the longitudinally extending power traces 216 within the body 204 of the cable 300. The dotted lines on the left and right of the figure indicate that the cable 300 continues longitudinally in both directions. Capacitors 226 are spaced apart from each other longitudinally, under and in electrical contact with the bottommost power trace 216.

Figure 14:
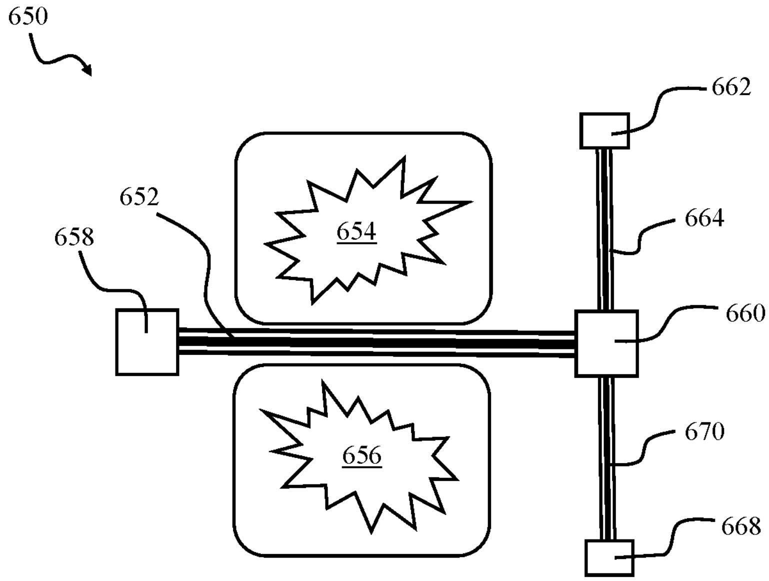
FIG. 14 illustrates a flexible cable including two arms.

FIG. 14 illustrates a flexible cable 650 which may include two arms which branch out from a portion of the cable between its two longitudinal ends. Cable 650 may take the form of any cable described herein. Cable 650 may include a first section 652 which leads from a first electronic component 658, which may include sources of power, ground, and signals to be transmitted. The first section 652 may be exposed to, e.g., be routed next to, one or more noisy electronic components 654, 656, the EM interference from which may disrupt signals being transmitted. By forming cable 650 at least in part as one of the cables described herein, the EM interference from the components 654, 656 can be attenuated and/or suppressed, and the signals transmitted through the cable can have higher signal-to-noise ratios.

Cable 650 may include a junction block 660 located along the length of the cable. Junction block 660 may include one or more switches, capacitors, repeaters, amplifiers, and the like, which facilitate the further transmission of signals along the cable 650, which may include splitting cable 650 into two arms 664, 670. In some embodiments, arm 664 leads to an electronic component 662, e.g., a transceiver, and arm 670 leads to an electronic component 668, e.g., a transceiver different from transceiver 662. When cable 650 is constructed as one of the cables described herein, each of the two arms 664, 670 may include power and signal traces only for the electronic component 662, 668, respectively. For example, the first section 652 of the cable 650 may act as a power and signal superhighway for multiple downstream electronic components, while arms 664, 670 act as local roadways for the power and signals destined for specified components 662, 668.

In some embodiments, junction block 660 may include signal enhancement circuitry for one or more downstream receiving components (e.g., components 662 and 668). This signal enhancement circuitry may include one or more repeaters to receive one or more signals from a signal trace in first section 652, and transmit regenerated versions of the one or more signals on a respective arm (e.g., arm 664 or 670). In some embodiments junction block 660 includes circuitry to identify the intended destination for one or more signals received from first section 652 of cable 650, and to direct the one or more signals to the identified destination. Signal enhancement circuitry in junction block 660 may include signal amplification circuitry to amplify a received signal from first section 652, before transmitting it to a destination (e.g., component 662). In some embodiments, junction block 660 merely provides a physical junction to split one or more traces within first section 652 of cable 650, onto a respective arm (e.g., arm 664 or arm 670). In some embodiments, cable 650 does not split after junction block 660 and continues to a single destination component.

In some embodiments, voltage regulators and/or DC-to-DC active circuits may also be placed in series in one or more of the power traces described herein to limit noise and step up or step down voltages. Furthermore, additionally high power switches may be added in one or more of the power traces described herein to manipulate voltage levels and direct voltage to desired locations.

Figure 15:
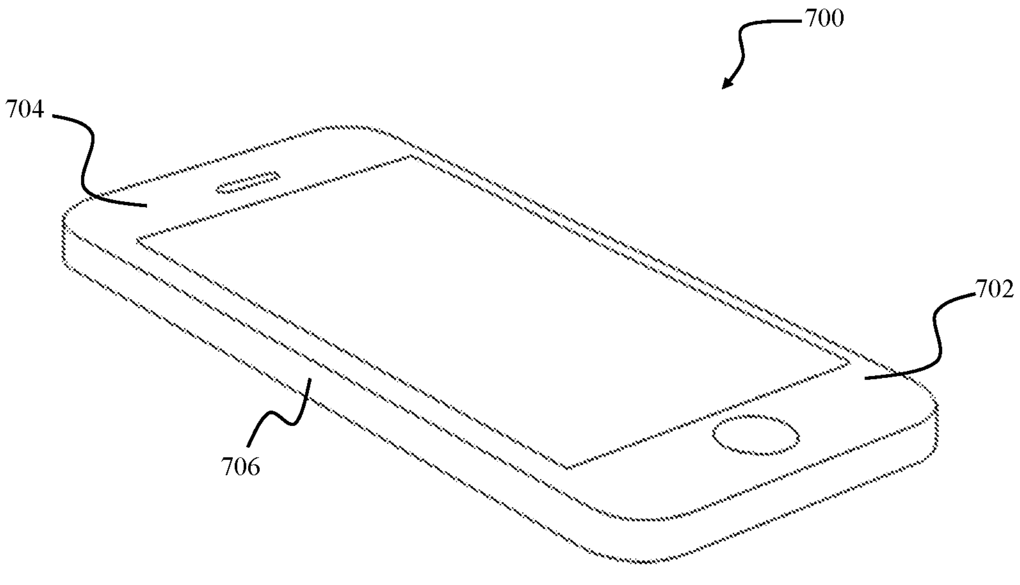
FIG. 15. illustrates an example mobile phone including a flex cable.

FIG. 15. illustrates an example mobile phone 700 including any of the flex cables described herein. The mobile phone 700 may include a housing 702 in which a radio transceiver, generally indicated at 704, is contained, and a flex cable, generally indicated at 706, extending through the housing to the radio transceiver.

Figure 16:
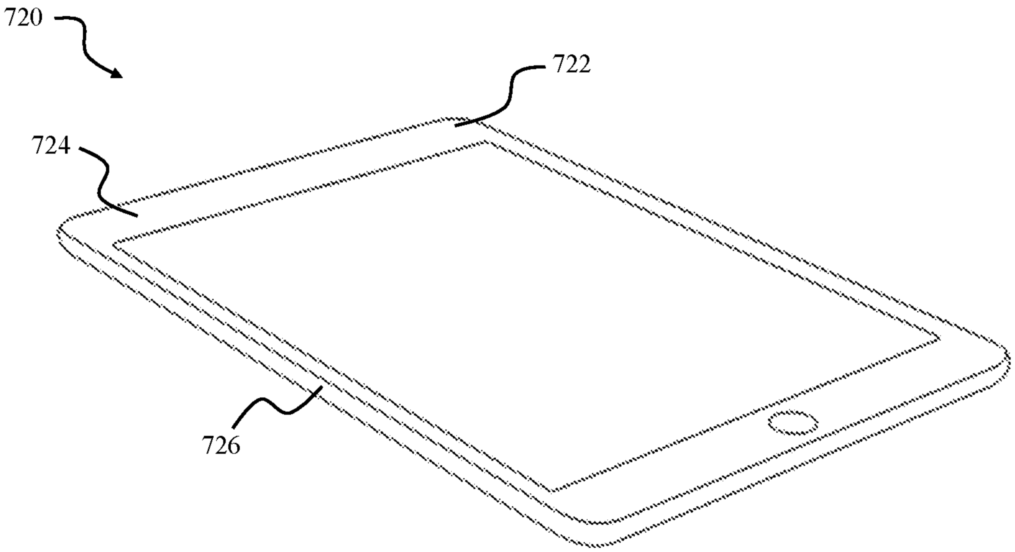
FIG. 16 illustrates an example tablet including a flex cable.

FIG. 16 illustrates an example tablet 720 including any of the flex cables described herein. The tablet 720 may include a housing 722 in which a radio transceiver, generally indicated at 724, is contained, and a flex cable, generally indicated at 726, extending through the housing to the radio transceiver.

Figure 17:
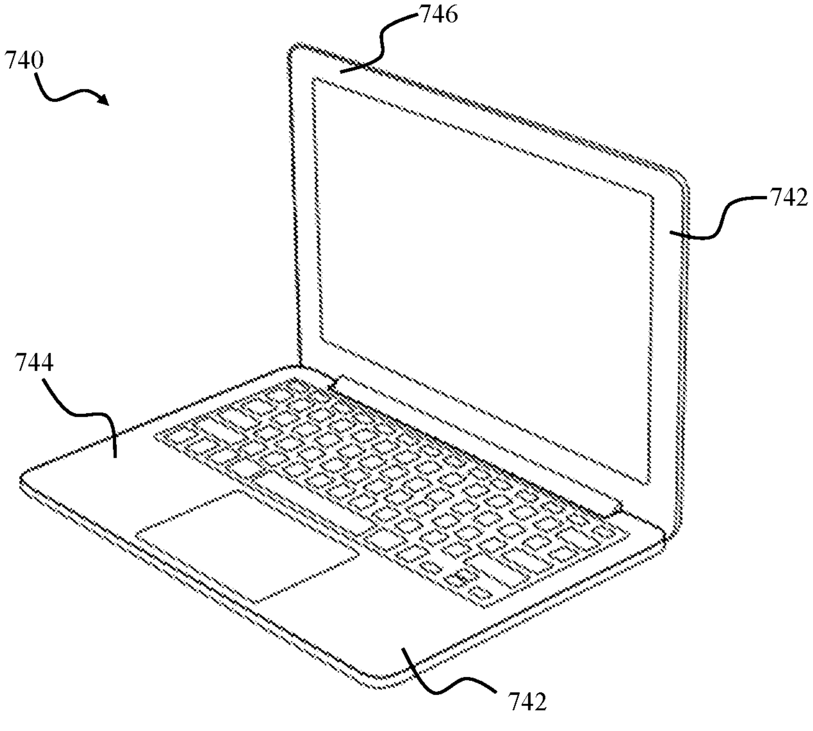
FIG. 17 illustrates an example laptop computer including a flex cable.

FIG. 17 illustrates an example laptop computer 740 including any of the flex cables described herein. The laptop 740 may include a housing 742 in which a radio transceiver, generally indicated at 746, is contained, and a flex cable, generally indicated at 744, extending through the housing to the radio transceiver.

In utilizing the various aspects of the embodiments, it would become apparent to one skilled in the art that combinations or variations of the above embodiments are possible for forming flexible cables including laterally and/or vertically segregated power, ground, and signal traces. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A flexible cable comprising:

a flexible body formed of an electrical insulation material, the flexible body including a top, a bottom vertically spaced from the top, with two sides extending vertically between the top and the bottom, the two sides being laterally spaced apart, wherein the flexible body includes first and second longitudinally spaced apart ends;

a plurality of conductive traces extending longitudinally through the flexible body between the first and second ends, wherein the plurality of conductive traces comprises;

a first power trace;

a first ground trace; and a first signal trace spaced laterally within the flexible body from the first power trace;

a second power trace spaced laterally within the flexible body from the first ground trace;

wherein the first signal trace is vertically spaced within the flexible body from the first ground trace; and a plurality of passive elements embedded in the flexible body, the plurality of passive elements including a first passive element embedded in the flexible body vertically between the first ground trace and the first power trace, and overlapping part of the first power trace;

wherein the first passive element is positioned vertically between the first power trace and the second power trace.

2. The flexible cable of claim 1, wherein the first passive element includes a first terminal in contact with the power trace and a second terminal in contact with the first ground trace.

3. The flexible cable of claim 1, wherein the electrical insulation material comprises a liquid crystal polymer (LCP) material.

4. The flexible cable of claim 1, wherein the plurality of passive elements comprises different frequency suppression bands.

5. The flexible cable of claim 1, wherein the first passive element is a capacitor.

6. The flexible cable of claim 1, further comprising an electromagnetic band gap (EBG) pattern formed in the first power trace.

7. The flexible cable of claim 1, further comprising a plurality of serial EBG patterns in the first power trace.

8. A flexible cable comprising:

a flexible body formed of an electrical insulation material, the flexible body including a top, a bottom vertically spaced from the top, with two sides extending vertically between the top and the bottom, the two sides being laterally spaced apart, wherein the flexible body includes first and second longitudinally spaced apart ends;

a plurality of conductive traces extending longitudinally through the flexible body between the first and second ends, wherein the plurality of conductive traces comprises:

a first power trace;

a first ground trace; and a first signal trace spaced laterally within the flexible body from the first power trace;

wherein the first signal trace is vertically spaced within the flexible body from the first ground trace; and wherein the first power trace is one of a plurality of power traces stacked vertically within the flexible body and laterally spaced from the first signal trace; and a first passive element embedded in the flexible body vertically between the first ground trace and the first power trace, and overlapping part of the first power trace.

9. The flexible cable of claim 8, wherein the electrical insulation material comprises a liquid crystal polymer (LCP) material.

10. The flexible cable of claim 8, wherein the plurality of conductive traces further comprises a lower ground trace located vertically beneath both the first signal trace and the first power trace.

11. The flexible cable of claim 10, wherein the plurality of conductive traces further comprises an upper ground trace located vertically above both the first signal trace and the first power trace.

12. The flexible cable of claim 10, further comprising an interference suppression trench extending vertically between the top of the flexible body and the bottom of the flexible body laterally adjacent to the first signal trace.

13. The flexible cable of claim 8, further comprising a junction block between the first and second ends, and wherein:

the plurality of conductive traces comprises a second signal trace, the flexible body splits into first and second arms at the junction block, the first signal trace extends from the junction block only through the first arm; and the second signal trace extends from the junction block only through the second arm.

14. The flexible cable of claim 13, wherein the junction block further comprises a switch, an interference suppressor, a signal enhancement circuitry, or combinations thereof.

15. A system comprising:

a first radio frequency transceiver, a second radio frequency transceiver, and a power source;

a flexible body formed of an electrical insulation material, the flexible body including a top, a bottom vertically spaced from the top, with two sides extending vertically between the top and the bottom, the two sides being laterally spaced apart, wherein the flexible body includes first and second longitudinally spaced apart ends;

a plurality of conductive traces extending longitudinally through the flexible body between the first and second ends, wherein the plurality of conductive traces comprises:

a first power trace;

a first ground trace; and a first signal trace spaced laterally within the flexible body from the first power trace;

wherein the first signal trace is vertically spaced within the flexible body from the first ground trace; and wherein the first power trace is one of a plurality of power traces stacked vertically within the flexible body and laterally spaced from the first signal trace; and a first passive element embedded in the flexible body vertically between the first ground trace and the first power trace, and overlapping part of the first power trace;

wherein the first power trace is connected to the power source and the first signal trace is connected to both of the first and second radio frequency transceivers to communicate a signal therebetween.

16. The flexible cable of claim 15, wherein the first passive element includes a first terminal in contact with the power trace and a second terminal in contact with the first ground trace.

17. The flexible cable of claim 15, wherein the first passive element is one of a plurality of passive elements embedded in the flexible body.

18. The flexible cable of claim 17, wherein the plurality of passive elements comprises different frequency suppression bands.

19. The flexible cable of claim 17, wherein the first passive element is a capacitor.

* * * * *